(12) United States Patent
Toy

(10) Patent No.: US 10,996,971 B2
(45) Date of Patent: May 4, 2021

(54) SERVICE OAM FOR VIRTUAL SYSTEMS AND SERVICES

(71) Applicant: Verizon Patent and Licensing Inc., Arlington, VA (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 175 days.

(21) Appl. No.: 16/033,651

(22) Filed: Jul. 12, 2018

(65) Prior Publication Data

US 2020/0019425 A1 Jan. 16, 2020

(51) Int. Cl.
*G06F 9/455* (2018.01)

(52) U.S. Cl.
CPC ............ *G06F 9/45558* (2013.01); *G06F 2009/45562* (2013.01); *G06F 2009/45595* (2013.01)

(58) Field of Classification Search
CPC ............ H04L 43/0811; H04L 12/4641; G06F 9/45558; G06F 9/45595; G06F 9/45562
See application file for complete search history.

(56) References Cited

U.S. PATENT DOCUMENTS

| | | | |
|---|---|---|---|
| 2007/0014290 A1* | 1/2007 | Dec | H04L 43/0811 370/390 |
| 2007/0025256 A1* | 2/2007 | Hertoghs | H04L 12/4633 370/236.2 |
| 2009/0161672 A1* | 6/2009 | Shimada | H04L 12/4625 370/389 |
| 2010/0115329 A1* | 5/2010 | Tanaka | G06F 11/201 714/5.11 |
| 2013/0194911 A1* | 8/2013 | Fedyk | H04L 43/0811 370/217 |
| 2013/0275568 A1* | 10/2013 | Nguyen | H04L 41/0806 709/223 |
| 2016/0344630 A1* | 11/2016 | Lee | H04L 41/0668 |
| 2017/0041201 A1* | 2/2017 | Ilyadis | H04L 43/08 |
| 2017/0097842 A1* | 4/2017 | Bugenhagen | G06F 13/4072 |
| 2018/0295031 A1* | 10/2018 | Holness | H04L 43/02 |
| 2020/0007422 A1* | 1/2020 | Ramanarayanan | H04L 45/02 |

* cited by examiner

*Primary Examiner* — Dong U Kim

(57) ABSTRACT

A device may create a virtualization layer on top of a physical layer of the device; create a virtual machine layer on top of the virtualization layer; create a virtual network function (VNF) layer based on the virtual machine layer and the virtualization layer; create a connection layer on top of the VNF layer; and create a first virtual maintenance endpoint (MEP) that includes a first virtual media access control (MAC) address. The first virtual MEP may be configured to: send a first continuity fault management (CFM) message to a physical MEP having a physical MAC address or a second virtual MEP having a second virtual MAC address; and receive a second CFM message from the physical MEP or the second virtual MEP.

20 Claims, 18 Drawing Sheets

FIG. 4

| VIRTUAL MP FUNCTION 402 | VIRTUAL MEP 404 | VIRTUAL MIP 406 | TRANSPARENT POINT 408 |
|---|---|---|---|
| INITIATE CONTINUITY CHECK (E.G., LOOPBACK AND LINK TRACE MESSAGES) | YES | NO | NO |
| RESPOND TO LOOPBACK AND LINK TRACE MESSAGES | YES | YES | NO |
| CATALOG CONTINUITY-CHECK INFORMATION | YES | YES | NO |
| FORWARD CFM MESSAGES | YES | YES | YES |

CFM: CONNECTIVITY FAULT MANAGEMENT

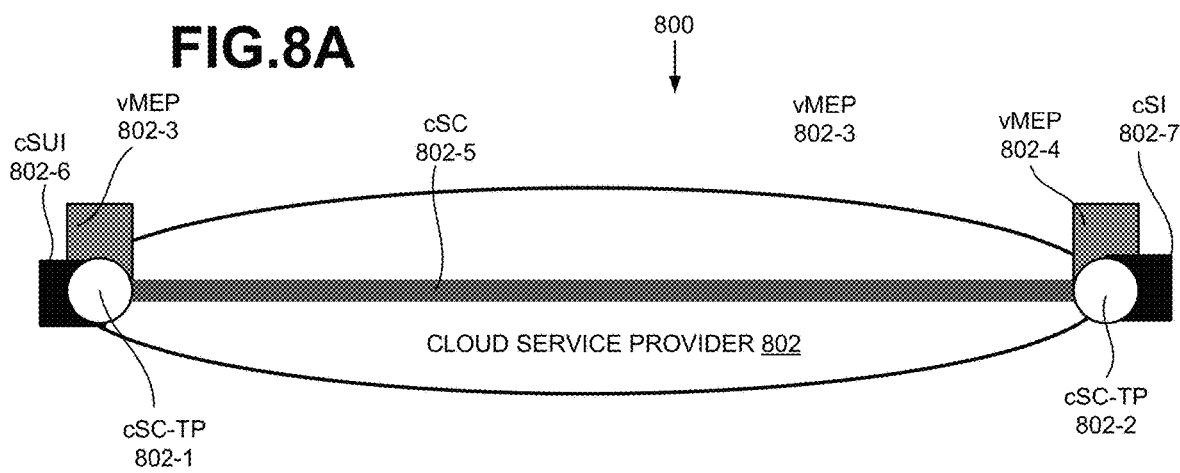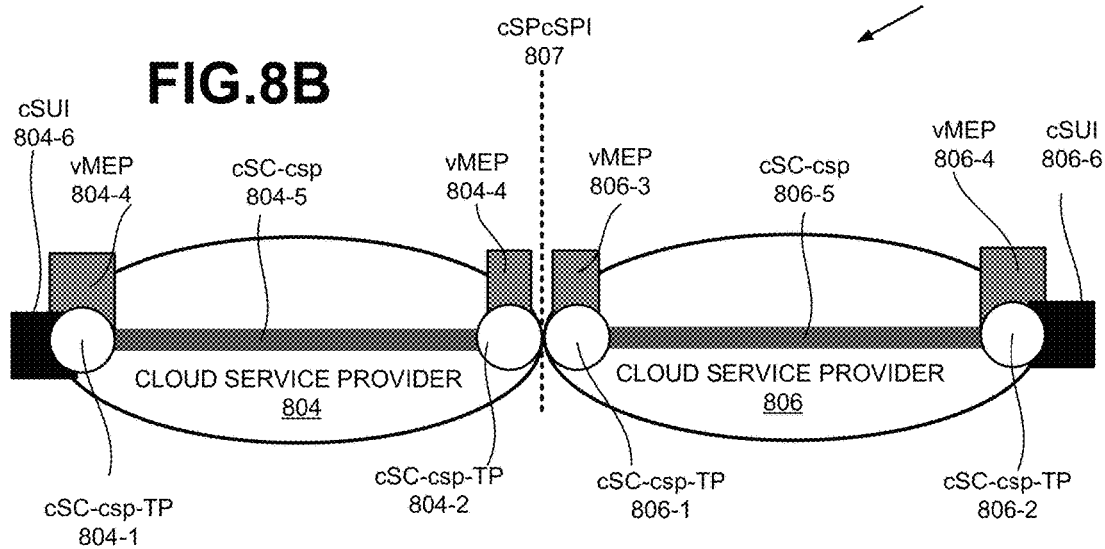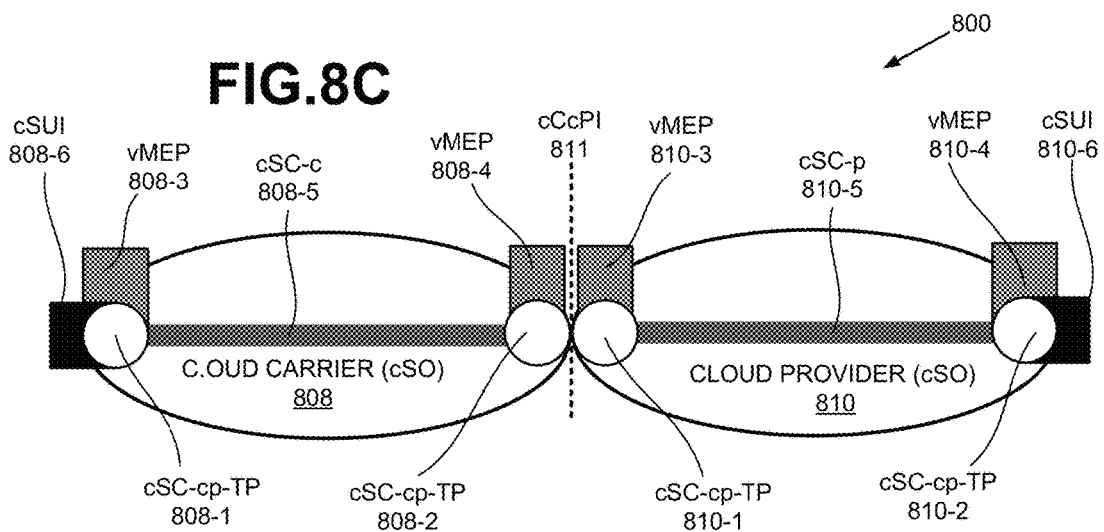

| MEL 1002 | VERSION 1004 | OPCODE 1006 | FLAGS 1008 | TLV OFFSET 1010 |
|---|---|---|---|---|
| SEQUENCE NO. 1012 ||||| 
| MEP ID 1014 ||||| 
| MEG ID 1016 ||||| 
| | | | TxFCf 1018 || 
| TxFCf 1020 ||| RxFCb 1022 || 
| RxFCb 1024 ||| TxFCb 1026 || 
| TxFCb 1028 ||| RESERVED 1030 || 
| RESERVED 1032 ||| END TLV 1034 ||

FIG. 12E
FIG. 12F
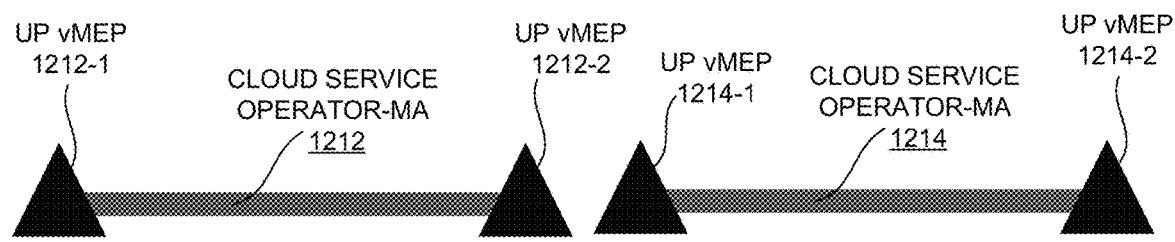
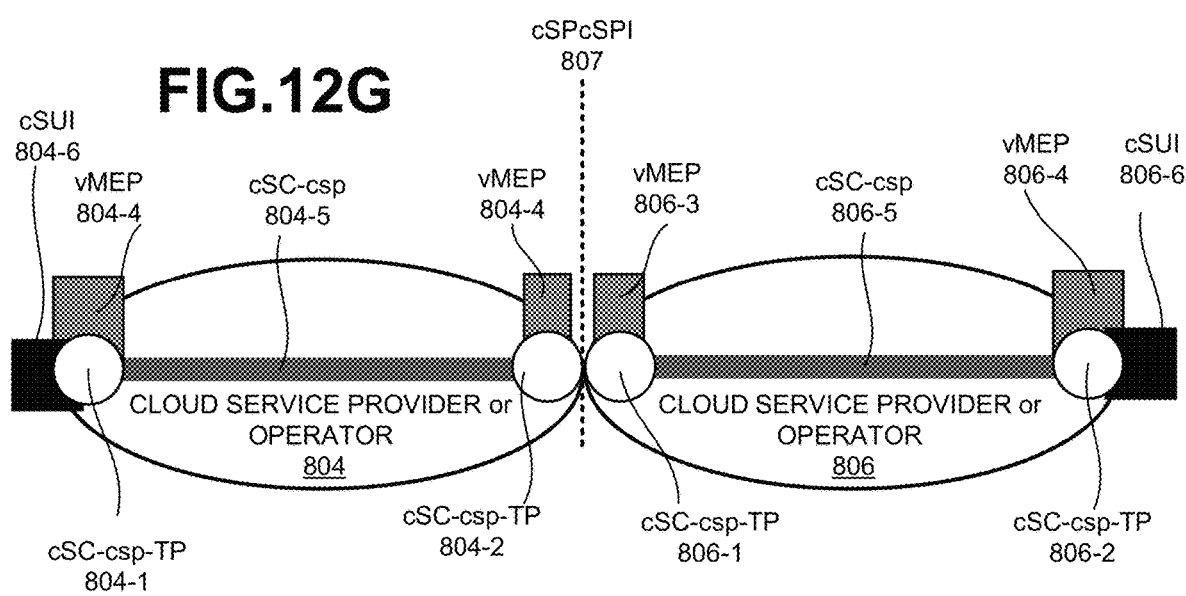
FIG. 12G

| MEL 1702 | VERSION 1704 | OPCODE 1706 | FLAGS 1708 | TLV OFFSET 1710 |
|---|---|---|---|---|
| TxTimeStampf 1712 ||||||
| RESERVED FOR DMM EQUIPMENT 1714 |||||
| RESERVED FOR DMR 1716 |||||
| RESERVED FOR DMR RECEIVING EQUIPMENT 1718 |||||
| END TLV 1720 |||||

| MEL 1802 | VERSION 1804 | OPCODE 1806 | FLAGS 1808 | TLV OFFSET 1810 |
|---|---|---|---|---|
| TxTimeStampf 1812 |||||
| RxTimeStampf 1814f |||||
| TxTimeStampb 1816 |||||
| RESERVED FOR DMR RECEIVING EQUIPMENT 1818 |||||
| END TLV 1820 |||||

SERVICE OAM FOR VIRTUAL SYSTEMS AND SERVICES

BACKGROUND INFORMATION

High availability is necessary for virtualized systems and services to minimize down time. To meet user expectation, the availability of virtualized systems and services should be on par with that of non-virtualized systems and services. However, high-availability designs for virtualized systems and services are much more complicated than their non-virtualized counterparts due to the existence of independent multiple layers where each layer may have its own failure recovery mechanism.

BRIEF DESCRIPTION OF THE DRAWINGS

FIG. 4 illustrates a table of exemplary virtual maintenance point (vMP) functions according to one implementation;

FIGS. 8A-8C illustrate exemplary locations of virtual maintenance points for a cloud service architecture;

FIG. 10 illustrates an exemplary continuity check message (CCM) PDU;

FIG. 12A-12G illustrate virtual maintenance endpoint (MEP) types in the cloud services architecture of FIG. 1;

FIG. 17 illustrates yet another exemplary vSOAM PDU implemented as a delay measurement message (DMM) PDU;

FIG. 18 illustrates yet another exemplary vSOAM PDU implemented as a delay measurement reply (DMR) PDU.

DETAILED DESCRIPTION OF PREFERRED EMBODIMENTS

The following detailed description refers to the accompanying drawings. The same reference numbers in different drawings may identify the same or similar elements.

For some virtual systems, there is no defined mechanism to verify whether all network, hardware, and software layers are ready to provide services. Furthermore, for Virtual Network Services and Hosted Network Services, there is no existing mechanism to monitor services end-to-end remotely, either periodically or on demand.

As described below, a virtual service operations, administration, and management (vSOAM) system may address the problems of testing and/or monitoring Virtual System, Virtual Network Services, and Virtual Hosted Network Services. A vSOAM implements virtual layer maintenance points (i.e., vMPs). A virtual Maintenance Points may include virtual Maintenance Endpoints (vMEPs) and/or virtual Maintenance Intermediate Points (vMIPs). vMEPs and vMIPs may initiate and terminate Continuity Fault Management (CFM) sessions. For example, vMEPs and vMIPs may initiate and terminate Continuity Check messaging (CCM) sessions, loopback messaging (LBM) sessions, and link trace messaging (LTM) sessions for each virtual layer and between virtual layers. In particular, the vMEPs and vMIPs may conduct messaging sessions to: test and monitor connection integrity; communication links between different application components; and verify a list of participating devices for a particular service.

The vMEPs and vMIPs may also initiate and terminate delay measurement messaging sessions. By issuing and/or forwarding delay measurement messages (DMMs) and delay measurement replies (DMRs), vMEPs and vMIPs may measure: one-way delay between layers; one way delay for each layer end-to-end between two endpoints of a cloud service connection (cSC) and cSC segments; and a round trip delay between layers within a virtual system and round trip delay for each layer end-to-end between two points of Cloud Service Connection (cSC)

In addition, the vMEP s and vMIPs may collect packet loss and throughput statistics. To collect the statistics, the vMEP and vMIP may send and/or forward loss measurement messages (LMM) and loss measurement replies (LMR).

Figure 1:
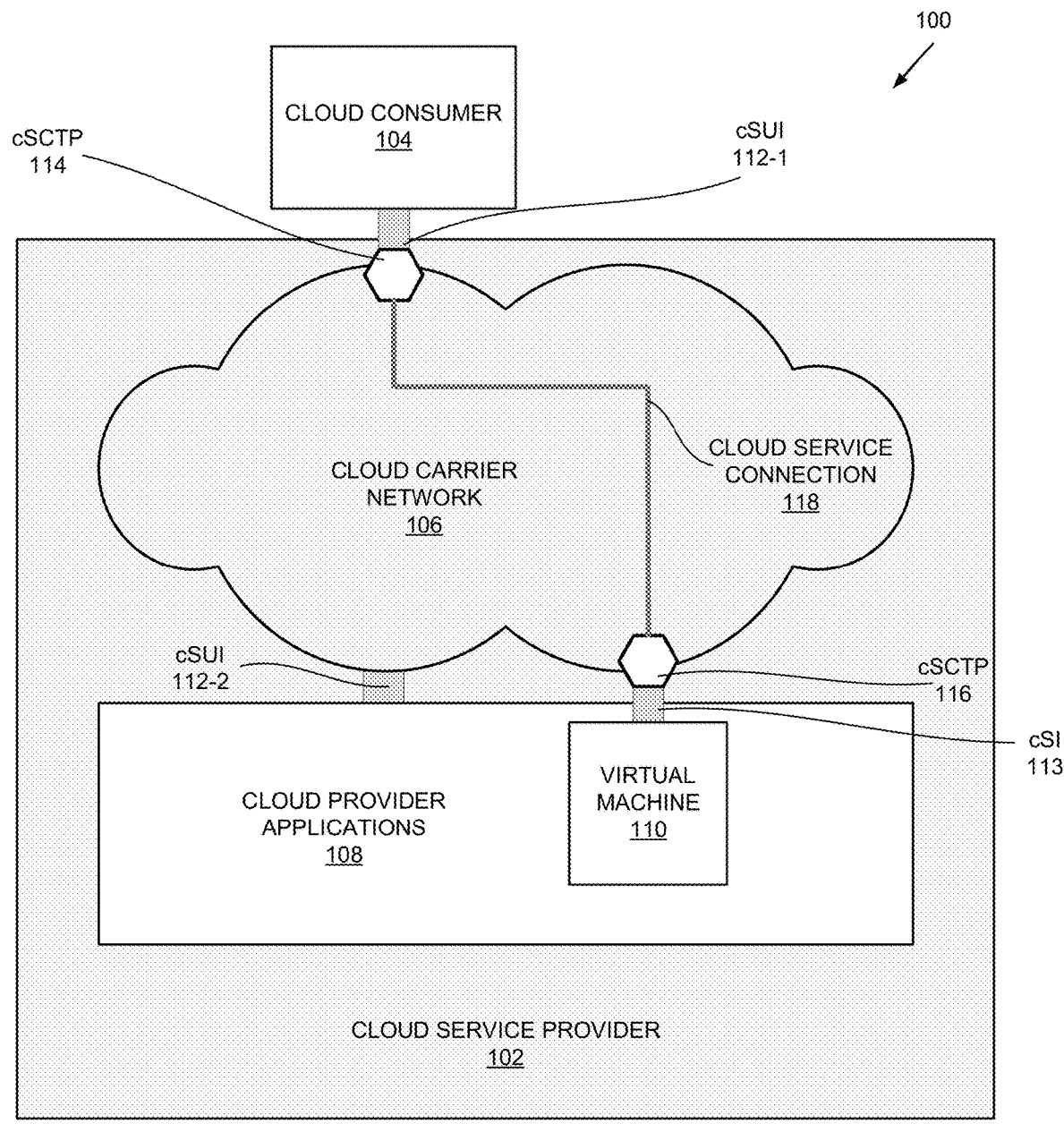
FIG. 1 shows an exemplary cloud services architecture that may implement the concepts described herein may.

FIG. 1 illustrates an exemplary cloud services architecture 100 that may implement the concepts described herein. As shown in FIG. 1, cloud services architecture 100 may include a cloud service provider 102 and a cloud service consumer 104 (also referred to as cloud consumer 104). Cloud service provider 102 may be responsible for the creation, delivery, and billing of cloud services, and may negotiate relationships among cloud providers and cloud carriers, cloud service operators, and/or cloud consumers. Cloud service provider 102 may provide a point of contact for cloud consumer 104. Cloud consumer 104, also referred to as a cloud Service User 104, may maintain a business relationship with and/or use services from a cloud service provider.

As further shown in FIG. 1, cloud service provider 102 may include a cloud carrier network 106 and a cloud provider applications 108. Cloud carrier network 106 may be owned and/or operated by a cloud carrier. A cloud carrier may represent an intermediary that provides connectivity and transport between cloud consumer 104 and cloud provider 106.

Cloud carrier network 106 may include one or more wireless and/or wireline networks of any type, such as, for example, a local area network (LAN), wide area network (WAN), wireless local area network (WLAN), wireless satellite network, and/or one or more wireless public land mobile networks (PLMNs). The PLMN(s) may include a Code Division Multiple Access (CDMA) 2000 PLMN, Global System for Mobile Communications (GSM) PLMN, an LTE PLMN, and/or other types of PLMNs not specifically described herein. Cloud carrier network 100 may also include one or more carrier Ethernet networks (CENs). A CEN may support Metro Ethernet Forum (MEF) services.

Cloud provider applications 108 may include applications that belong to a cloud provider, an entity responsible for making cloud applications available to cloud consumer 104. Cloud provider 106 may have one or more devices that host virtual machines (VMs) 110.

In FIG. 1, cloud consumer 104 accesses a cloud service provided through a virtual machine 110 at cloud provider 108. The access is made through cloud Service User Interface (cSUI) 112-1. The cloud service rides over a cloud service connection (cSC) which is originated and terminated at cloud Service Connection Termination Points (cSCTPs) 114 at cSUI 112-1 and cSI 113. As shown, cSC 118 connects cSCTP 114 to a cSCTP 116 to which virtual machine 110 talks via cSI 113. Although not shown, a cloud service connection may be made between two users, between two machines, or between VMs provided by a cloud service provider and its associated entities.

Figure 2:
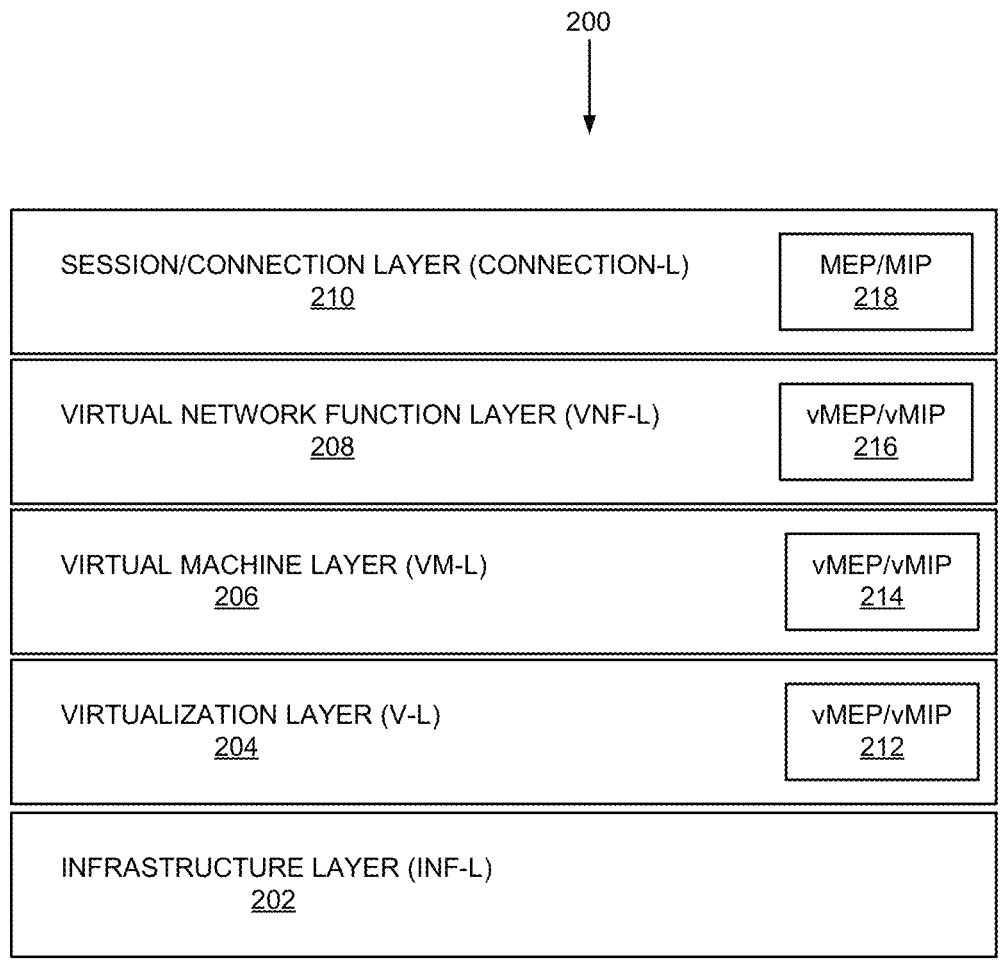
FIG. 2 shows exemplary layers of a virtual system that may be included in the architecture of FIG. 1.

Network elements in cloud carrier network 106 are arranged or constructed in layers. FIG. 2 shows exemplary layers of a virtual system 200 that may be included in cloud services architecture 100. As shown, cloud services architecture 100 may include an infrastructure layer (INF-L) 202, a virtualization layer (V-L) 204, a virtual machine layer (VM-L) 206, a virtual network function layer (VNF-L) 208, and a connection layer 210. Depending on the implementation, cloud services architecture 100 may include additional, fewer, or different layers than those illustrated in FIG. 2.

Infrastructure layer 202 may include physical components or devices. For example, infrastructure layer 202 may include network devices (e.g., a server device, a router, a computer, a switch, etc.), and/or network components such as networked processors, network-attached storage (NAS), etc. Depending on the implementation, infrastructure layer 202 may also include an operating system, which may provide support for the immediate layer above (i.e., virtualization layer 204). Virtualization layer 204 may provide virtualization of infrastructure layer functions (e.g., hardware and/or certain software functions) to virtual machines.

Virtual machine layer 206 may include virtual machines. Depending on the implementation, virtual machine layer 206 may include virtualized hardware and/or software (e.g., operating system). Virtual network function layer 208 may include virtualized network functions/components or virtualized applications. Connection layer 210 may provide components for establishing connection and connection termination points (also called end points).

During operations, one or more components in each of the layers illustrated in FIG. 2 can fail. Hence, to test and monitor various components in the layers, each of the layers in FIG. 2 may also include a number of virtual maintenance points (MPs). Each maintenance point is an actively managed Operations, Administration, and Management (OAM) entity configured to send various messages to test and monitor components of the layers.

A virtual maintenance point may include either a virtual Management Entity Group (MEG) endpoint (vMEP) or a virtual Maintenance domain Intermediate Point (vMIP). A vMEP is an endpoint of a single virtual MEG, which includes virtual maintenance entities (MEs) associated with a Cloud Service Connection (cSC). Each virtual maintenance entity may include two points for measurements and for monitoring of a device in a virtual cSC or a service provided by the device.

A vMIP may be located internal to a domain and not at a boundary. When a vMIP receives Continuity Fault Management (CFM) frames from a vMEP on the same Maintenance Entity Group (MEG) level as the vMIP (each vMP has a MEG level as explained with respect to FIG. 11), vMIP catalogs the frames and forwards the frames. If a frame is from a vMEP at a lower MEG level, the vMIP will drop the frame. Because each vMIP is a passive point, a vMIP may respond only when it is triggered by CFM messages, link trace messages, and/or loopback messages. In contrast to a non-virtual MEP or MIP, a vMEP and a vMIP may include a virtual Media Access Control (MAC) address.

Figure 3:
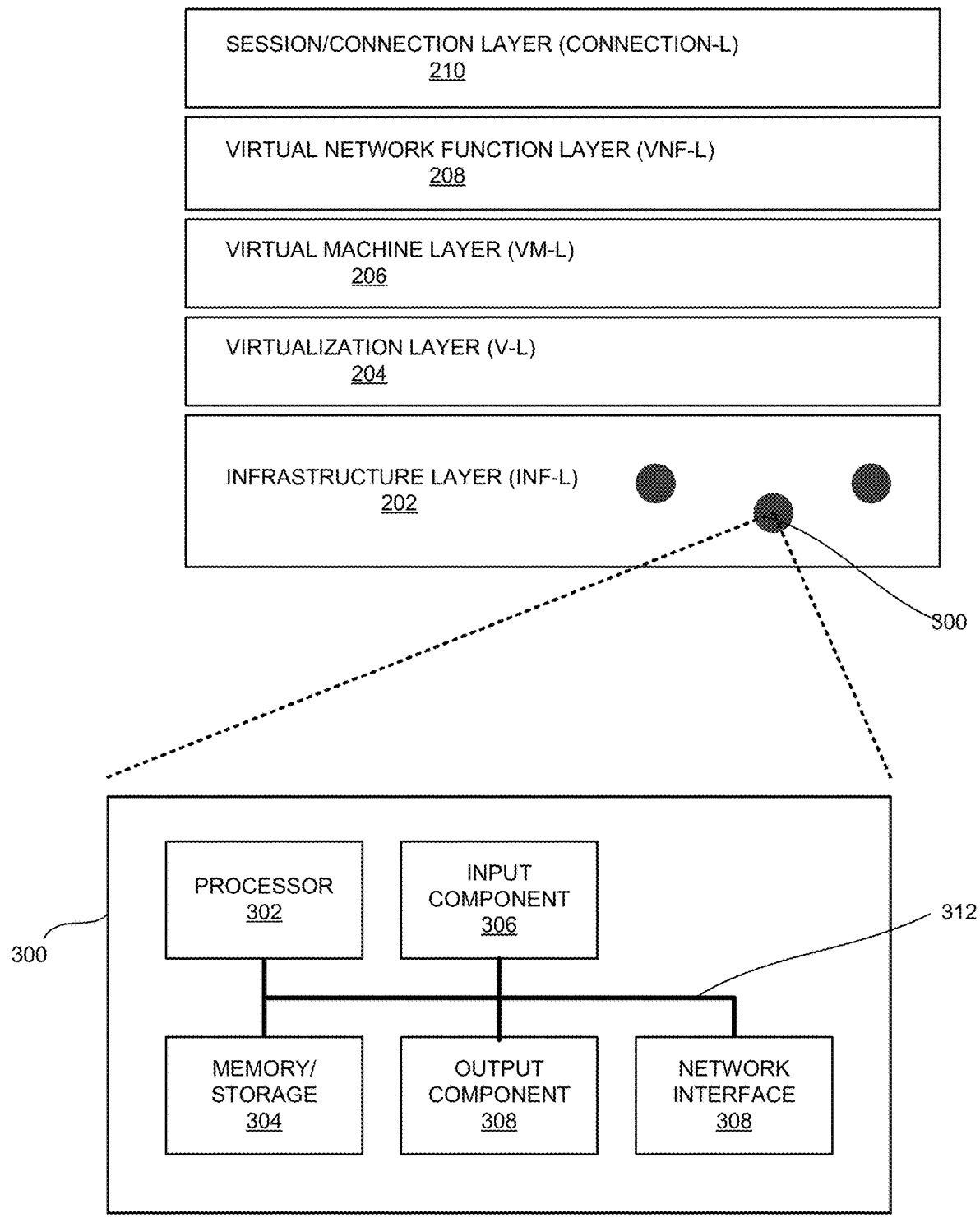
FIG. 3 illustrates exemplary components of network devices included in the infrastructure layer of FIG. 2.

FIG. 3 illustrates exemplary components of network devices included in infrastructure layer 202. As shown, infrastructure layer 202 may include one or more network devices 300. Each network device 300 may include a processor 302, memory/storage 304, input component 306, output component 308, network interface 310, and communication path 312. In different implementations, network device 300 may include additional, fewer, different, or a different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include network-attached storage, a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may receive input from a user and provide output to a user. Input/output components 306 and 308 may include, for example, a display screen, a keyboard, a mouse, a speaker, a microphone, a camera, a DVD reader, USB lines, and/or other types of components. Depending on the implementation, network devices 300 may or may not include input component 306 and/or output component 308 (e.g., no console or monitor).

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc. Network interface 310 may include a modem, an Ethernet interface to a LAN, and/or an interface/connection for connecting device 300 to other devices (e.g., a Bluetooth interface).

Communication path 312 may provide an interface (e.g., a bus) through which components of device 200 can communicate with one another.

In some implementations, network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein. In other implementations, the instructions may be hard coded.

For example, when network device 300 is implemented as a host to a virtual machine, network device 300 may execute instructions that are associated with a hypervisor. The device may also support vMEP or a vMIP functions. As already discussed above, a vMEP and vMIP may initiate and terminate messaging sessions to test and monitor network elements.

FIG. 4 illustrates a table 400 of exemplary virtual maintenance point (vMP) functions according to one implementation. As shown, table 400 includes four columns: virtual maintenance point (MP) function column 402, vMEP column 404, vMIP column 406, and transparent point column 408. Table 408 illustrates, for each of the functions listed on virtual MP function column 402, whether a vMEP, a vMIP, and transparent point support the function. A transparent point is a network node that is transparent from the vSOAM function perspective.

For example, consider column 402, for "initiate continuity check." vMEP column 404, vMIP column 406, and transparent point column 408 show "YES," "NO," and "NO" values, respectively, which indicate that a vMEP (but not vMIP and a transparent point) may initiate continuity checks (e.g., send loopback and link trance messages, send replies to loopback and link trace messages, etc.). In another example, as also shown by table 400, both vMEP and vMIP may catalog continuity check information. A vMEP, a vMIP, and a transparent point all may forward continuity check messages.

Figure 5:
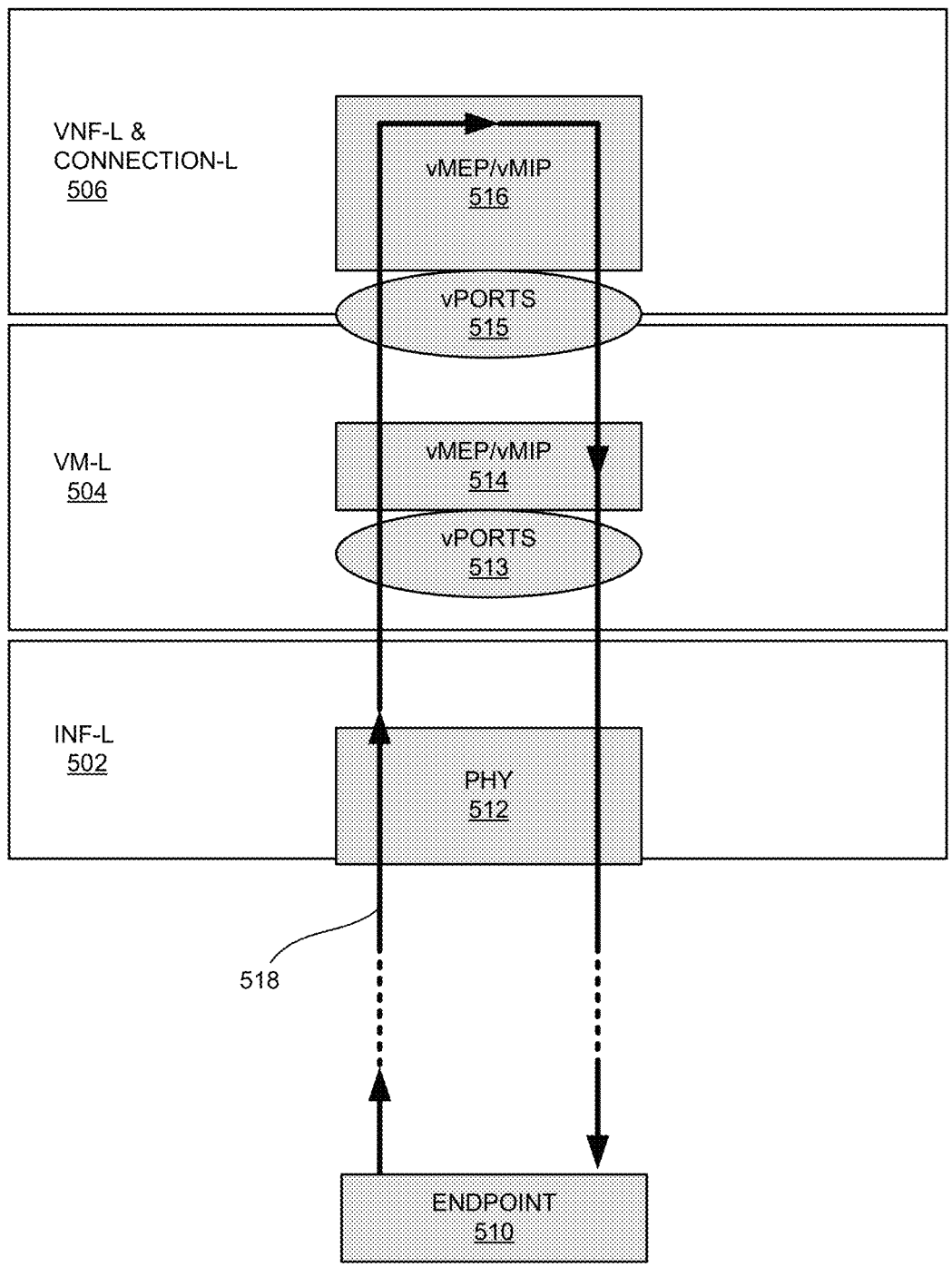
FIG. 5 shows an exemplary path for test messages through virtual maintenance points.

FIG. 5 shows an exemplary path for test messages through maintenance points. As shown, a virtual system 500, which may be included in cloud services architecture 100, comprises an infrastructure layer (INF-L) 502, virtual machine layer (VM-L) 504, virtual network function and connection layers 506 (simply denoted VNF-L 506 for simplicity).

INF-L 502 in FIG. 5 represents not only a physical layer 512 but also a virtualization layer (not shown), which has been already discussed. VM-L 504 and VNF-L 506 respectively include a vMEP/vMIP 514 and vMEP/vMIP 516. To be capable of operating as a network entity within a network, each of vMEP/vMIP 514 and vMEP/VMIP 516 includes a virtual MAC address and a port (for example, port 513 for vMEP/MIP 514 and port 515 for vMEP/vMIP 516).

To test and/or monitor virtual Port (vPort) 515 of VNF-L, end point 510 can send loopback test messages to vMEP/vMIP 516. The test frames will be looped back by vMEP/vMIP 516 to the end point 510 for loss frame or round trip measurements. To test and/or monitor vPort 513 of VM-L 504, the end point 510 can send loopback test messages to vMEP/vMIP 514. The test frames will be looped back by vMEP/vMIP to the end point 510 for loss frame or round trip measurements.

Each vMEP and vMIP is associated with a MEG level. The MEG level of a vMEP or a vMIP can affect how the vMEP/vMIP responds to incoming test messages. This property is not explicitly illustrated in FIG. 5.

Figure 6A:
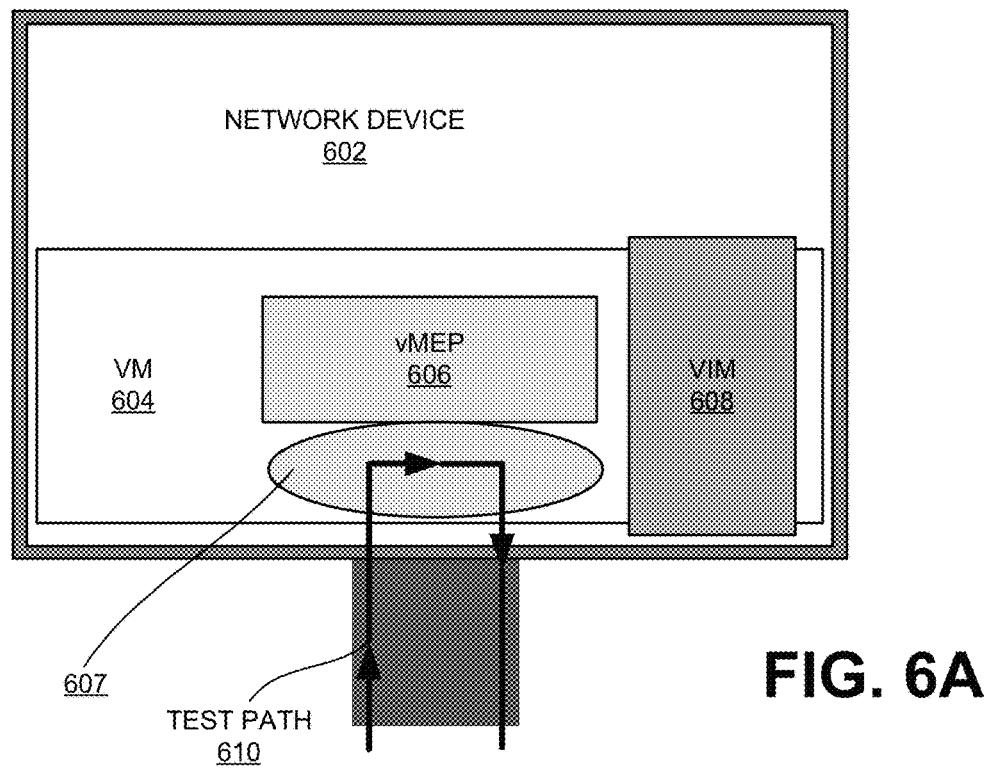
FIG. 6A shows an exemplary path for test messages through a virtual maintenance point on a virtualized system managed by a service provider.

FIG. 6A shows an exemplary path for test messages through a maintenance point. In contrast to FIG. 5, which does not specify a hardware component, FIG. 6A illustrates a network device 602 managed by service provider. As shown, network device 602 includes a VM 604 that is supported by a virtual infrastructure manager (VIM) 608 and includes vMEP 606. Although network device 602 may include additional components, they are not illustrated in FIG. 6A.

VM 602 is instantiated, for example, on top of a virtualization layer. VIM 608 may configure virtualized components, hardware, and/or underlying network components.

In FIG. 6A, a testing entity (e.g., a customer) may inject test messages into vMEP 606 through test path 610. The messages may be sent through a physical layer (also referred to as "hardware layer") to vMEP 606 via port 607. The test message may return to the testing entity through path 610, down through the physical layer.

Figure 6B:
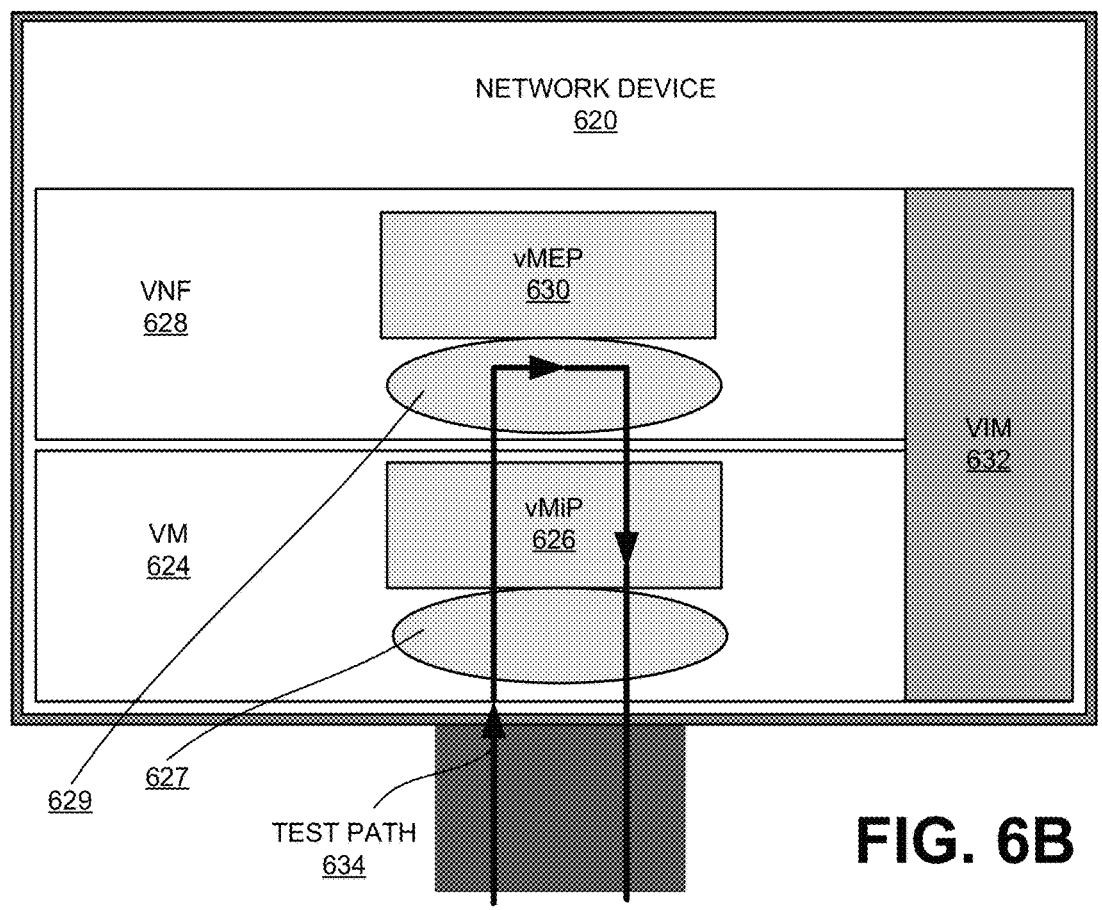
FIG. 6B shows another exemplary path for test messages through virtual maintenance points in a customer-owned virtual network function, which is implemented by a virtualized system, managed by a service provider.

FIG. 6B shows another exemplary path for test messages through maintenance points. As shown, network device 620 may include a virtual machine 624 and a virtual network function (VNF) 628. As in FIG. 6A, a VIM 632 supports/controls VM 624. VNFM (VNF Manager) that manages VNF is not shown in the figure. In contrast to FIG. 6A, however, a customer (e.g., a cloud consumer) also owns (e.g., leases) VNF 628. As further shown, VM 624 and VNF 628 may include vMIP 626 and vMEP 630, respectively.

In FIG. 6B, a testing entity (e.g., a customer) may send test messages to vMEP 630 through a test path 634. The messages may be sent from the testing node through a hardware layer to vMIP 626 via port 627. Assuming the message bears the destination vMAC address of vMEP 630, vMIP 626 passes the messages to vMEP 630 via port 629. The test messages may return to the testing entity through the remainder of path 634, down through vMIP 626 and the hardware layer.

Figure 7A:
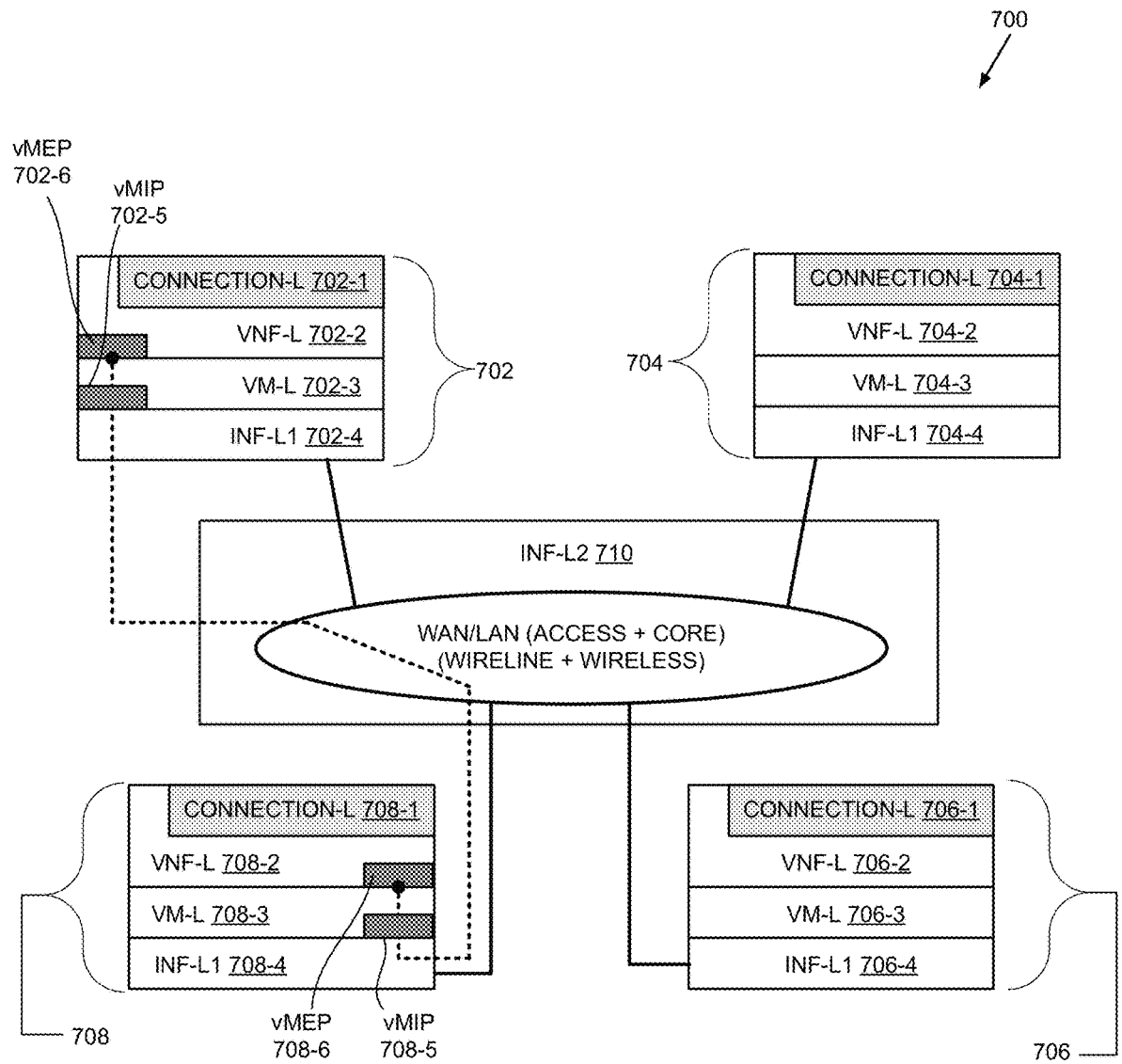
FIG. 7A illustrates an exemplary path for test messages through virtual maintenance points in a cloud services architecture that includes virtualized systems.

FIG. 7A illustrates an exemplary path for test messages through maintenance points in a cloud services platform 700 that includes virtual systems. Cloud Services platform 700 is an example of a portion of cloud services architecture 100 depicted in FIG. 1. As shown, cloud services platform 700 includes one or more entities 702, 704, 706, and 708 interconnected by infrastructure layer (INF-L2 710).

Although cloud services platform 700 may include additional elements (e.g., devices) and/or networks, they are not illustrated in FIG. 7 for simplicity.

Each of entities 702, 704, 706, and 708 may comprise one or more network devices 300 and may include a virtual network function layer (VNF-L), which includes a connection layer (connection-L), virtual machine layer (VM-L), and an infrastructure layer (INF-L). Thus, entity 702 includes a VNF-L 702-2 (with connection-L 702-1), VM-L 702-3, and INF-L1 702-4; entity 704 includes a VNF-L 704-2 (with connection-L 704-1), VM-L 704-3, and INF-L1 704-4; entity 706 includes VNF-L 706-2 (with connection-L 706-1), VM-L 706-3, and INF-L1 706-4; and entity 708 includes VNF-L 708-2 (with connection-L 708-1), VM-L 708-3, and INF-L1 708-4.

INF-L2 710 provides one or more networks, such as a WAN or a LAN, that interconnect network entities 702, 704, 706, and 708, as well as other devices not illustrated in FIG. 7. The networks may be wireless networks and/or wireline networks (e.g., wireless LAN).

In FIG. 7A, vMEP 708-6 in VNF-L 708-2 sends test messages to vMEP 702-6. To reach the destination vMEP 702-6, the messages first arrive at vMIP 708-5 in VM-L 708-3. vMIP 708-5 is an intermediate point, so, it forwards the received messages. The messages then pass through INF-L1 708-4 and INF-L2 710 to entity 702. At entity 702, the messages pass through INF-L1 702-4 and vMIP 702-5, to reach vMEP 702-6. The messages may pass through other network entities, devices, or networks, but they are not illustrated in FIG. 7A.

Figure 7B:
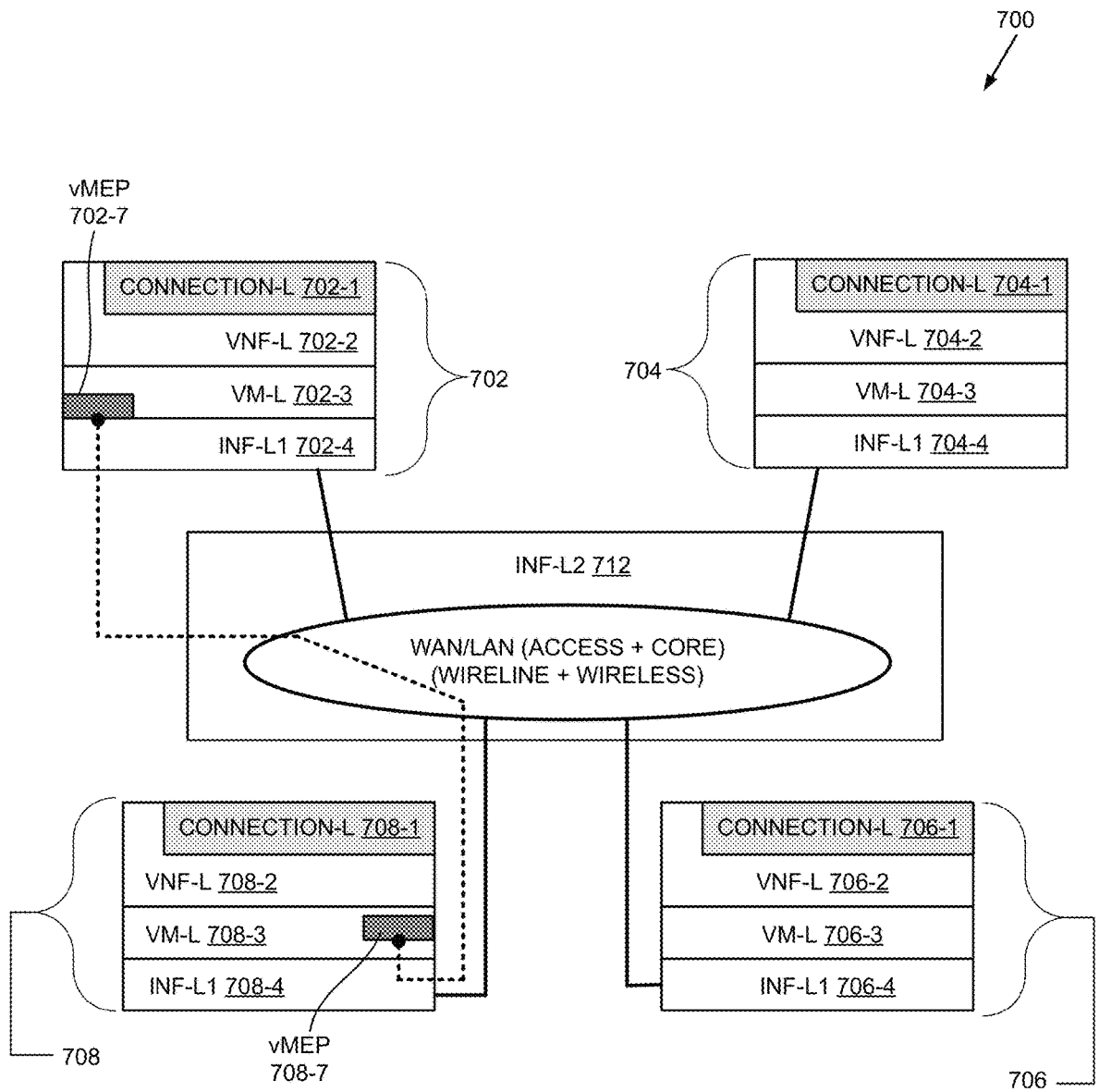
FIG. 7B illustrates another exemplary path for test messages through virtual maintenance points in a cloud services architecture that includes virtualized systems.

FIG. 7B illustrates another exemplary path for test messages through virtual maintenance points in cloud services platform 700. FIG. 7B mostly illustrates the same elements as FIG. 7A, except that FIG. 7B shows vMEP 708-7 in VM-L 708-3, and vMEP 702-7 in VM-L 702-3.

To conduct its test, vMEP 708-7 sends test messages to vMEP 702-7. The messages travel through INF-L1 708-4, in entity 708 and INF-L2 710, and arrives at entity 702.

FIGS. 8A-8C illustrate exemplary locations of virtual maintenance points (vMP) for a portion 800 of cloud services architecture 100. FIG. 8A illustrates a cloud service provider 802 that has at least two endpoints—cloud Service Connection Termination points (cSCTPs) 802-1 and 802-2. A cSCTP may include a logical entity that originates or terminates a cloud service connection at a logical user interface. As shown, cSCTP 802-1 includes a vMEP 802-3; and cSCTP 802-3 includes a vMEP 802-4. cSCTPs 802-1 and 802-2 are connected by cloud Service Connection (cSC) 802-5. and also includes cSUI 802-6 and cSI 802-7, respectively.

FIG. 8B illustrates two cloud service providers 804 and 806. Cloud service provider 804 has two endpoints—cloud Service Provider Connection Termination Point (cSC-csp-TP) 804-1 and cSC-csp-TP 804-2. FIG. Similarly, cloud service provider 806 has two endpoints—cSC-csp-TP 806-1 and cSC-csp-TP 806-2.

cSC-csp-TP 804-1 and 804-2 include vMEP 804-3 and vMEP 804-4, respectively; and cSC-csp-TP 806-1 and 806-2 include vMEP 806-3 and 806-4, respectively. cSC-csp-TP 804-1 and cSC-csp-TP 804-2 are connected by cloud service provider connection (cSC-csp) 804-5; and cSC-csp-TP 806-1 and cSC-csp-TP 806-2 are connected by cSC-csp 806-5. cSC-csp-TP 804-1 and cSC-csp-TP 806-2 are associated with cSUI 804-6 and cSUI 806-6, respectively.

As shown, vMEP 804-4 and vMEP 806-3 may pass test messages through an interface, cloud Service Provider to cloud Service Provider Interface (cSPcSPI) 807. Because vMEP 804-4 and 806-3 are at the same vMEG level, the messages are not dropped as they travel from cSP 804 to cSP 806 or vice versa, over cSPcSPI 807.

FIG. 8C illustrates a cloud carrier 808 and a cloud provider 810. Cloud carrier 808 has two endpoints—cloud Carrier-Provider Connection Termination Points (cSC-cp-TP) 808-1 and cSC-cp-TP 808-2. Likewise, cloud provider 810 has two endpoints—cSC-cp-TP 810-1 and cSC-cp-TP 810-2. Cloud Carrier and Cloud Provider are also called as Cloud Service Operator (cSO). In the architecture of FIG. 8C, one of the cSOs (i.e. Cloud Carrier or Cloud Provider) acts as the cSP which is the single point of contact for Cloud User and responsible for cloud services end-to-end.

cSC-cp-TP 808-1 and 808-2 include vMEP 808-3 and vMEP 808-4, respectively; and cSC-cp-TP 810-1 and 810-2 include vMEP 810-3 and vMEP 810-4, respectively. cSC-cp-TP 808-1 and cSC-cp-TP 808-2 are connected by cloud carrier connection (cSC-C) 808-5; and cSC-cp-TP 810-1 and cSC-cp-TP 810-2 are connected by cloud provider connection (cSC-p) 810-5. vMEPs 808-4 and 810-3 may pass test messages to one another over a cloud carrier-provider interface cCcPI 811. cSC-cp-TP 808-1 and cSC-cp-TP 810-2 are associated with cSUI 808-6 and cSUI 810-6, respectively.

Figure 9:
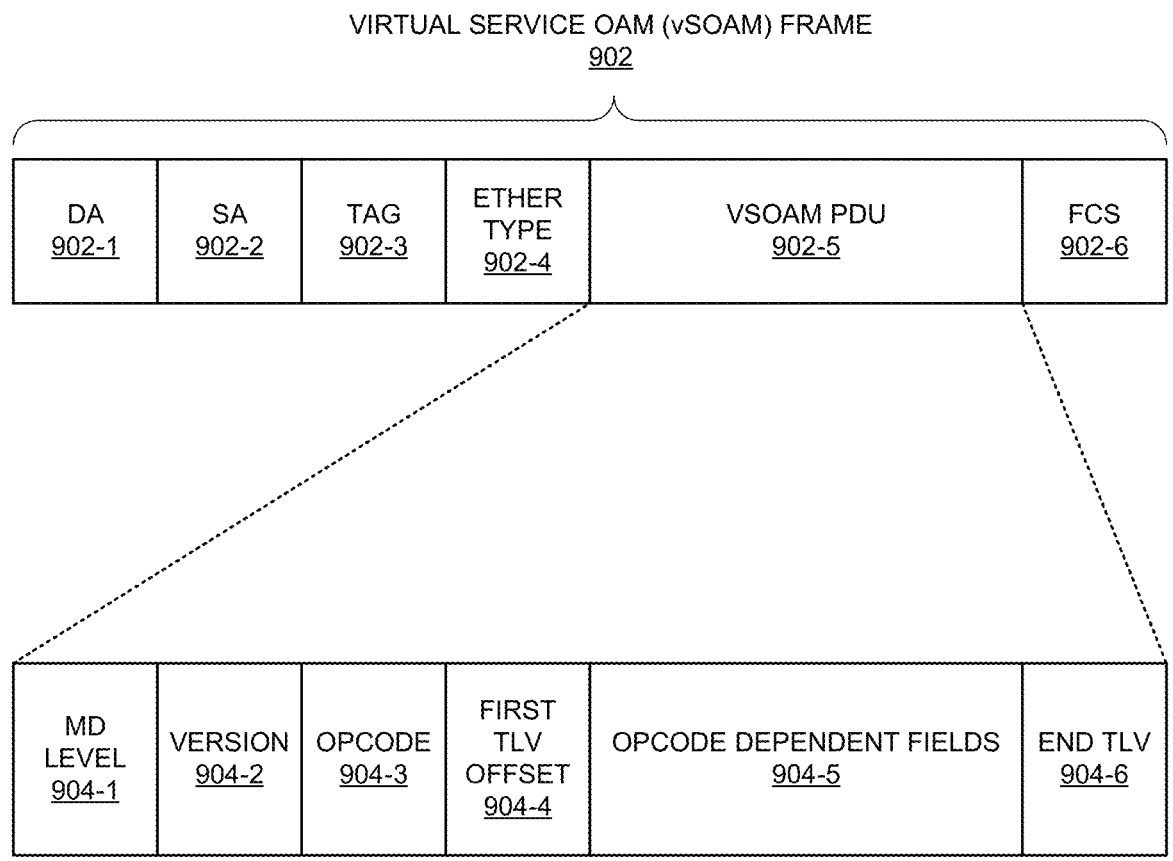
FIG. 9 illustrates an exemplary virtual service Operations, Administration and Maintenance (vSOAM) protocol data unit (PDU)

FIG. 9 illustrates an exemplary virtual service Operations, Administration and Maintenance (vSOAM) frame 902. When a vMEP in one of FIGS. 5-7B sends a message, the message may be sent as an vSOAM frame—that is, an Ethernet frame with a particular format illustrated in FIG. 9. As shown, vSOAM frame 902 may include a destination address (DA) field 902-1, a source address (SA) field 902-2, a tag field 902-3, an Ether type field 902-4, a Connectivity Fault Management (CFM)-header field 902-5, and a frame check sequence (FCS) field 902-6. For simplicity, FIG. 9 does not illustrate a preamble and a frame delimiter, although they may be considered part of an Ethernet frame.

DA field 902-1 and SA field 902-2 may carry a destination virtual MAC address and a source virtual MAC address, respectively. Tag field 902-3 may carry an identifier and/or other parameters associated with a virtual LAN (VLAN). Ether type field 902-4 may carry the Ethernet frame type or the length of the frame. vSOAM PDU field 902-5 may carry OAM protocol data unit (PDU). FCS field 902-6 may carry a cyclic redundancy check (CRC) code.

As further shown, vSOAM PDU may include a MEG level field 904-1, a version field 904-2, an opcode field 904-3, a first type-length-value (TLV) field 904-4, opcode dependent fields 904-5, and an end TLV field 904-6. MEG level field 904-1 may indicate a MEG level that is associated with a maintenance entity. A MEG level may be also referred to as maintenance domain (MD) level, maintenance association (MA) level, etc. Version field 904-2 may be set to zero. Opcode field 904-3 may carry information which indicates the type of CFM message the frame carries. A vMEP or a vMIP may send or receive different types of CFM messages, depending on what function or parameter vMEP is testing or monitoring (e.g., a loopback message, CCM, link trace message (LTM), etc.).

First TLV offset field 904-4 may indicate how many bytes must be skipped over before locating the TLV information within frame 900. For example, if the offset is zero, the TLVs start immediately after the header. TLVs may not start immediately after field 904-4 because some vSOAM PDU types insert non-TLV encoded information, such as sequence numbers or timestamps. For processing speed, these types of information may be best placed at known offsets from the beginning of vSOAM PDU 902-5, rather than contained as a TLV.

Opcode dependent fields 904-5 may include information that is dependent on values of opcode 904-2 (and hence on the type of message). End TLV field 904-6 may include a specific code sequence indicating the end of TLV, such as zero.

FIG. 10 illustrates an exemplary continuity check message (CCM) PDU 1000, which is one of many different types of vSOAM PDU 900. After being enabled, a vMEP may periodically send a CCM (e.g., at one of several possible transmission periods). CCMs allow detecting loss of continuity between vMEPs. When a vMEP does not receive the expected CCM for a specified time period, the vMEP may send an alert or a message indicating the loss of continuity. A vMEP may send CCMs also to: discover other vMEPs or MEPs; detect unwanted connectivity between vMEPs and/or MEPs; etc.

As shown, a CCM PDU 1002 may include a MEG Level (MEL) field 1002 (aka MD level), version number field 1004, opcode field 1006, flags field 1008, TLV offset field 1010, sequence number field 1012, MEP ID field 1014, MEG ID field 1016, TxFCf field 1028, TxFCf field 1020, RxFCb field 1022, RxFCb field 1024, TxFCb field 1026, TxFCb field 1018, and reserved fields 1030 and 1032, and an end TLV field 1034.

Fields 1002 and 1004 correspond to fields 902 and 904 of FIG. 9 and serve a similar purpose. Opcode field 1006 corresponds to opcode field 906 and may include an opcode corresponding to a CCM (e.g., "0x01"). Flags field 1008 may indicate different conditions of an entity, monitoring state, etc. For example, flags field 1008 may indicate a transmission period (e.g., 3.3 milliseconds to 10 minutes); carry a Remote Detection Indicator (RDI); etc. TLV offset field 1010 corresponds to field 904-4, and for a CCM PDU, may be set to 70. Sequence number field 1012 may indicate a number associated with a particular CCM PDU among a sequence of CCM PDUs. A vMEP may determine whether a particular CCM is not received or lost by tracking the sequence numbers of the received CCMs. MEP ID field 1014 may identify the vMEP within the vMEG specified by MEG ID field 1016. MEG ID field 1016 may identify the network operator responsible for the vMEG.

Fields 1018-1028 may be related to measuring frame losses. TxFCf field 1018 and 1020 may indicate the number of in-profile data frames transmitted by the vMEP to a peer vMEP/MEP. RxFCf field 1022 and 1024 may indicate the number of the data frames received by the vMEP from a peer vMEP/MEP. TxFCb field 1026 and 1028 may repeat the value of TxFCf field 1018 and 1020 in the last frame received from the peer vMEP/MEP. Reserved field 1030 and 1032 is reserved, and end TLV field 1034 corresponds to end TLV field 904-6 of FIG. 9.

Figure 11:
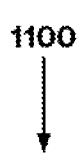
FIG. 11 illustrates a table of maintenance entity group (MEG) levels (MELs) for elements in the cloud services architecture of FIG. 1.

FIG. 11 illustrates a table 1100 of MEG levels (MELs) for elements in cloud services architecture 100. As discussed above, each vMEP/vMIP may be associated with a MEG level, and hence, in FIG. 1, each network element that corresponds to a vMEP/vMIP may also be associated with a MEG level.

As shown, table 1100 includes a Maintenance Entity/ Associations) (MA) column 1102, a vMEG level (MEL) column 1104 (which indicates a MEL for each MA in column 1102), and MEP type column 1104. MA column 1102 lists a cloud service user-MA 1102-1, a test-MA 1102-2, a cSC-MA 1102-3, cSI-MA 1102-4, a cloud service operator (cSO)-MA 1102-5, a cSUI-MA 1102-6, and a cSPcSPI-MA 1102-7.

For the listed MAs in column 1102, the MEG levels as indicated by MEL column 1104 are: 6, 5, 4, 1, 2, 1, and 1, respectively. The possible values of each MEL are 0-7, with 0 being the highest level and 7 being the lowest level.

Table 1100 also includes a MEG type column 1106, which indicates whether each MEP of the MA listed in column 1102 is an up MEP or a down MEP. A down vMEP is a vMEP in which vSOAM PDUs are sent from a specific port (e.g., cSUI, cSI or cSPcSPI). In contrast, when vSOAM PDUs are sent toward the (virtual) Bridge's Relay Function, the vMEP is an up vMEP. Similarly, if vSOAM PDUs arrive by the Bridge Relay Function, the receiving vMEP is an up vMEP. Returning to table 1100, column 11-4 lists "up," "down," "up," "down," "up," "down," and "down." for the MAs listed in column 1102.

Figure 12A:
Figure 12B:
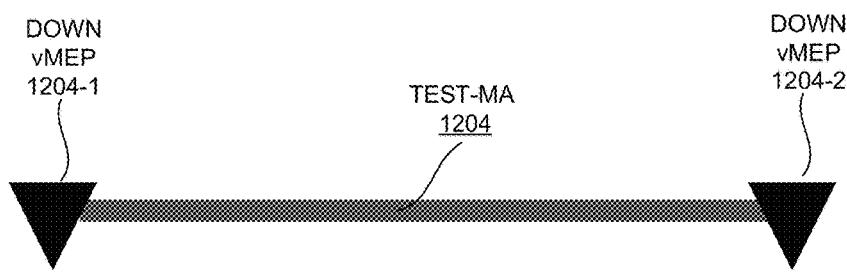
Figure 12C:
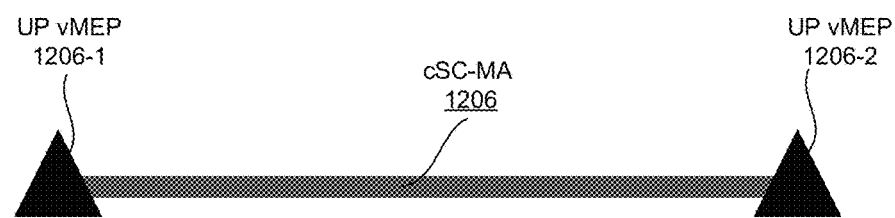
Figure 12D:
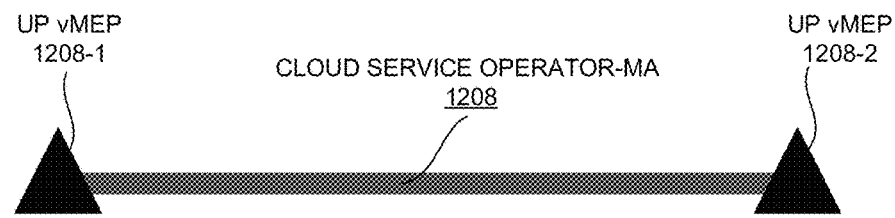

FIGS. 12A-12F illustrate virtual Maintenance Endpoint (MEP) types for connections in cloud services architecture 100. FIG. 12A shows a cloud service user-MA 1202. Cloud service user-MA is terminated by an up vMEP 1202-1 and an up vMEP 1202-2; FIG. 12B shows a test-MA 1204 terminated by a down vMEP 1204-1 and a down vMEP 1204-2; FIG. 12C shows a cSC-MA 1206 having an up vMEP 1206-1 and an up vMEP 1206-2; FIG. 12D shows a cloud service operator-MA 1208 with an up vMEP 1208-1 and an up vMEP 1208-2; and FIG. 12E shows a cloud service provider-MA 1210 with an up VMEP 1210-1 and an up vMEP 1210-2.

FIG. 12F shows two MAs: a cloud service operator-MA 1212 and a cloud service operator 1214. Cloud service operator-MA 1212 includes an up vMEP 1212-1 and an up vMEP 1212-2; and cloud service operator-MA 1214 includes an up vMEP 1214-1 and an up vMEP 1214-2. Each of vMEPs in FIG. 12F belongs to an endpoint in FIG. 8B, which is re-illustrated below FIG. 12F as FIG. 12G. For example, under up vMEP 1212-2 and vMEP 1212-2 belong to cSC-csp-TP 804-2 and cSC-csp-TP 806-1.

Figure 13:
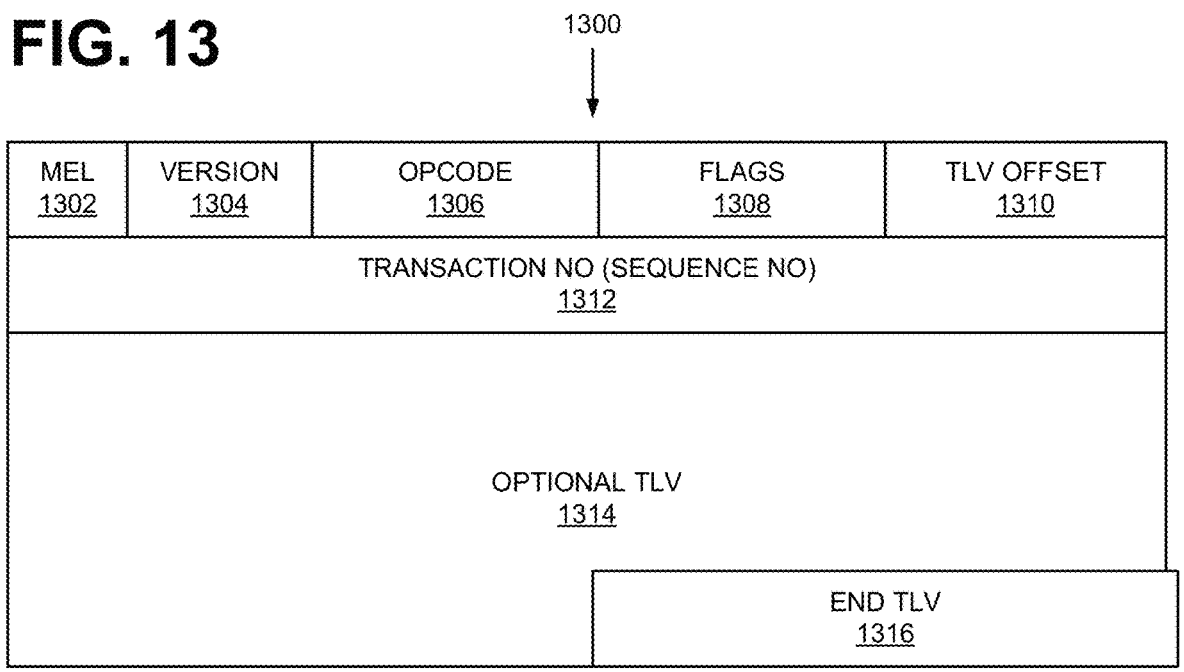
FIG. 13 illustrates an exemplary vSOAM PDU implemented as a loop back message (LBM) PDU.

FIG. 13 illustrates an exemplary vSOAM PDU 902 implemented as a loop back message (LBM) PDU 1300. vSOAM PDU 902 may be used for both in-service and out-of-service loopback. Out-of-service loopback may be used while setting up a connection before the service is provided, to measure throughput of unloaded paths or for troubleshooting. On the other hand, in-service loopback maybe used to continuously monitor bidirectional connectivity to detect service failures and trigger protection switching mechanisms. No response from the target vMEP may indicate the presence of connectivity issues associated with the target vMEP.

As shown in FIG. 1300, LBM PDU 1300 may include a MEL field 1302, version field 1304, opcode field 1306, flags field 1308, TLV offset field 1310, sequence number field 1312, optional TLV field 1314, and an end TLV field 1316. Fields 1302, 1304, 1308, 1310, and 1316 correspond to fields 902, 904, 1008, 1010, and 1034 described above with reference to FIGS. 9 and 10. Opcode field 1306 may include the value of 3 according to one implementation, and flags field 1308 may carry the value of zero. Sequence number field 1312 may include the count of the LBM. Optional TLV field 1314 may include other parameters.

Figure 14:
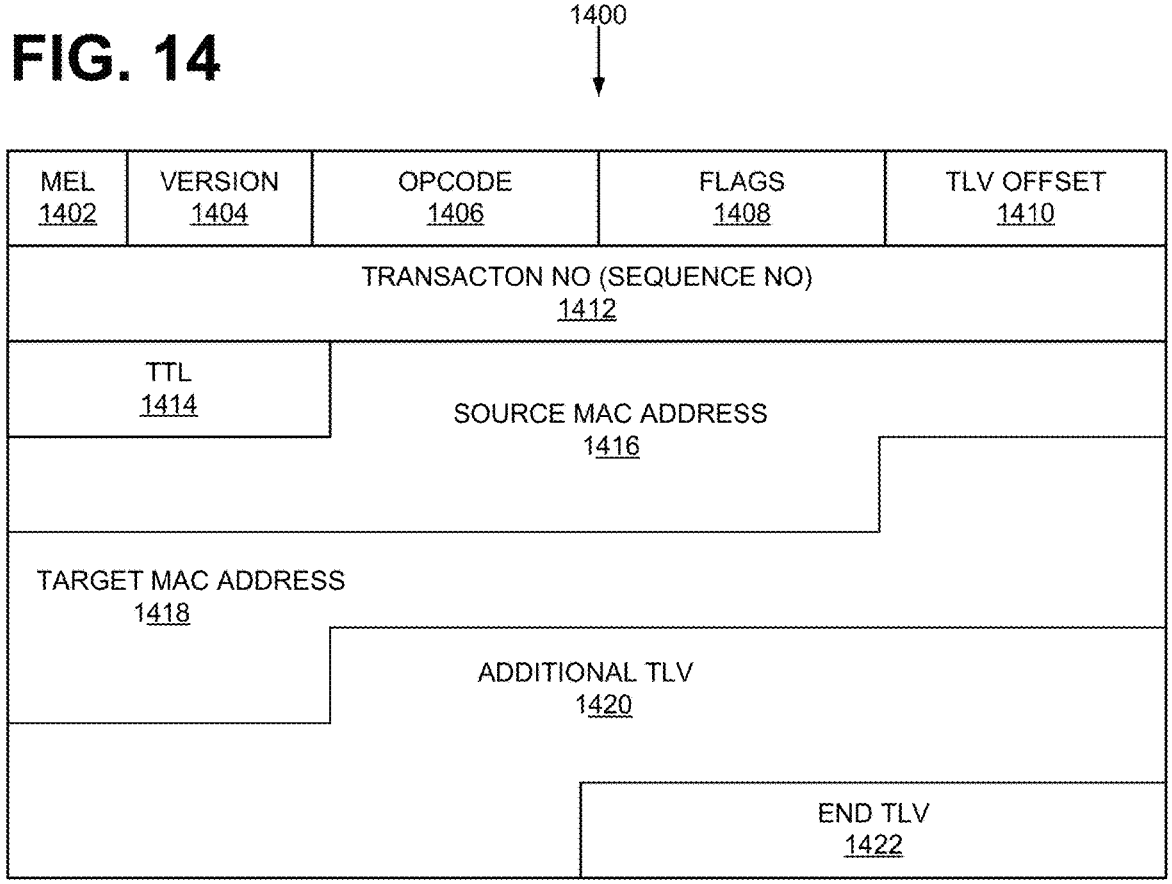
FIG. 14 illustrates another exemplary vSOAM PDU implemented as a link trace message (LTM) PDU.

FIG. 14 illustrates another exemplary vSOAM PDU 902 implemented as a link trace message (LTM) PDU 1400. vMEPs may send LTM PDUs 1400 (and Link Trace Reply (LTR) PDUs) to check bi-directional continuity between two points, as well as to identify the network forwarding elements that lie along the path between them. For example, a probing vMEP may transmit an LTM PDUs 1400 that is set to timeout at the next hop. The return messages may then identify the adjacent cloud services node. Subsequently, another LTM PDU 1400 which is set to timeout after two hops may be sent, and so on.

As shown LTM PDU 1400 may include a MEL field 1402, version field 1404, opcode field 1406, flags field 1408, TLV offset field 1410, sequence number field 1412, TTL field 1414, source MAC address field 1416, target MAC address field 1418, additional TLV field 1420, and an end TLV field 1422.

MEL field 1402, and version field 1404 may carry information similar to that carried by MEL fields 1302 and 1304. Opcode field 1406 may identify LTM PDU with the value of 5. Flags field 1408 may carry information similar to flags field 1008. TLV offset 1410 may be set to 17. Sequence number field 1412 may include information similar to sequence number field 1312. TTL field 1414 may indicate how long the LTM PDU may live. Source MAC address field 1416 may include the virtual MAC address of transmitting vMEP, and target MAC address field 1418 may include the (virtual) MAC address of the target vMEP/MEP. Additional TLV 1420 and end TLV 1422 may carry information similar to those carried by fields 1314 and 1316 in LBM PDU 1300.

Figure 15:
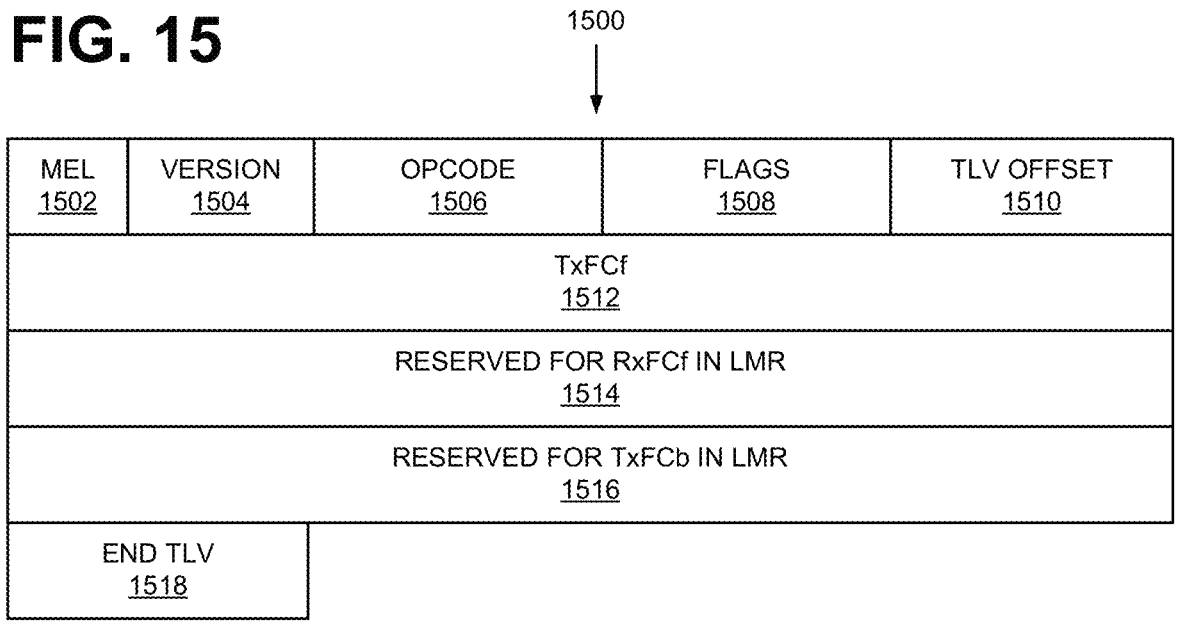
FIG. 15 illustrates another exemplary vSOAM PDU implemented as a loss measurement message (LMM) PDU.

FIG. 15 illustrates another exemplary vSOAM PDU 902 implemented as a loss measurement message (LMM) PDU 1500. A vMEP may measure frame losses by issuing LMM PDUs 1500 to a peer vMEP and by receiving loss measurement replies (LMRs) from the peer vMEP (e.g., by tracking the counts of the transmitted messages and replies—non-responses would indicate lost messages). As shown, LMM PDU 1500 may include a MEL field 1502, version field 1504, an opcode field 1506, flags field 1508, TLV offset field 1510, TxFCf field 1512, reserved for LMR RxFCf field 1514, reserved for LMR TxFCb field 1516, and an end TLV field 1518.

MEL field 1502 and version field 1504 may include values similar or analogous to MEL field 1302 and version field 1304. Opcode field 1506, flags field 1508, and TLV offset field 1510 may include the values 43, 0, and 12, respectively. TxFCf field 1512 may indicate the number of in-profile data frames transmitted to a target vMEP. Reserved fields 1512 and 1514 are left unspecified, and end TLV field 1518 may carry information similar to that by TLV field 1316 (e.g., zero).

Figure 16:
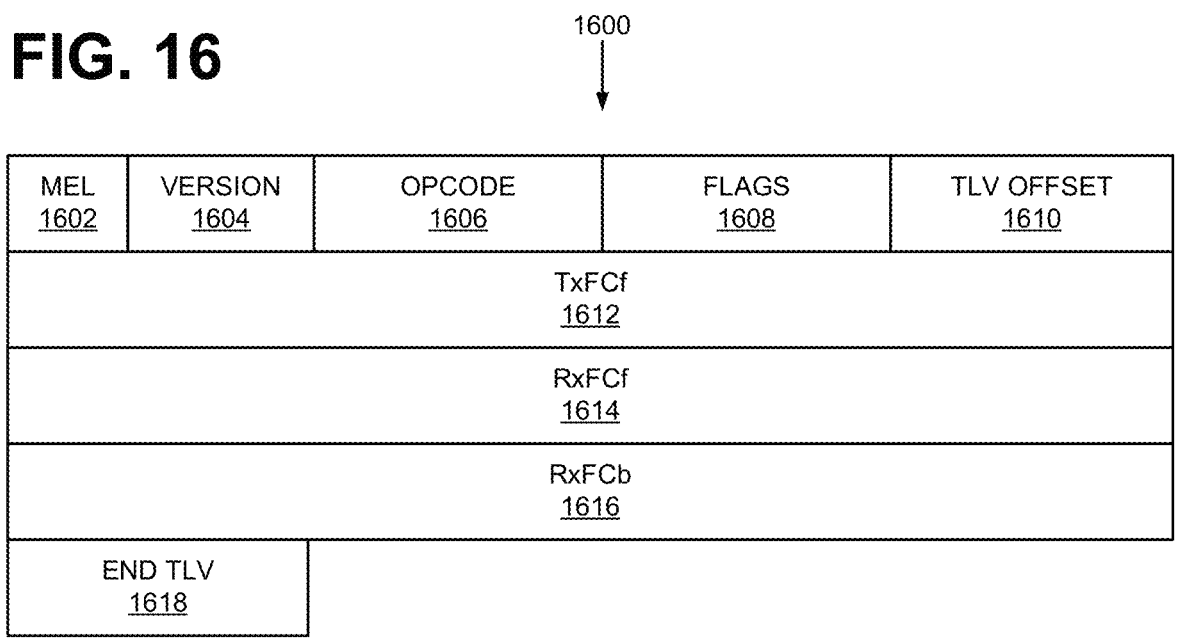
FIG. 16 illustrates yet another exemplary vSOAM PDU implemented as a loss measurement reply (LMR) PDU.

FIG. 16 illustrates yet another exemplary vSOAM PDU implemented as a loss measurement reply (LMR) PDU 1600. As shown LMR PDU 1600 may include a MEL field 1602, version field 1604, opcode field 1606, flags field 1608, TLV offset field 1610, TxFCf field 1612, RxFCf field 1614, TxFCb field 1616, and end TLV field 1618.

MEL field 1602 and version field 1604 may include values similar or analogous to MEL field 1502 and version field 1504. Opcode field 1606, flags field 1608, and TLV offset field 1610 may include the values 42, 0, and 12, respectively. TxFCf field 1612 may include the value of TxFCf field 1512 in the received LMM PDU 1500. RxFCf field 1614 may include the number of in-profile frames received at the replying vMEP/MEP. TxFCb field 1616 may include the number of in-profile frames sent by the replying vMEP/MEP. End TLV field 1618 may carry the value of zero.

FIG. 17 illustrates yet another exemplary vSOAM PDU implemented as a delay measurement message (DMM) PDU 1700. A vMEP may measure delays in frame delivery by using the times of PDU transmissions and receipt. As shown, DMM PDU 1700 may include a MEL field 1702, version field 1704, an opcode field 1706, flags field 1708, TLV offset field 1710, TxTimeStampt field 1712, reserved for DMM equipment field 1714, reserved for DMR field 1716, reserved for DMR receiving equipment field 1718, and end TLV field 1720.

MEL field 1702 and version field 1704 may include values similar or analogous to MEL field 1502 and version field 1504. Opcode field 1706, flags field 1708, and TLV offset field 1710 may include the values 47, 0, and 32, respectively. TxTimeStampf field 1712 may include the time of the frame transmission. Fields 1714, 1716, and 1718 may be unspecified or set to zero. End TLV field 1720 may be set to zero.

FIG. 18 illustrates yet another exemplary vSOAM PDU 902 implemented as a delay measurement reply (DMR) PDU 1800. As shown DMR PDU 1800 may include a MEL field 1802, version field 1804, an opcode field 1806, flags field 1808, TLV offset field 1810, TxTimeStampf field 1812, RxTimeSteampf field 1814, TxTimeStampb field 1816, reserved for DMR receiving equipment field 1818, and an end TLV field 1820.

MEL field 1802 and version field 1804 may include values similar or analogous to MEL field 1502 and version field 1504. Opcode field 1806, flags field 1808, and TLV offset field 1810 may include the values 12, 0, and 32, respectively. TxTimeStampf field 1812 may include a copy of the TxTimeStampf field 1712 value. RxTimeStampb field 1814 may indicate the time of receipt of the DMM PDU. TxTimeStampb field 1816 may indicate the time of transmission of the DMR PDU. End TLV 1820 may carry zero.

Figure 19:
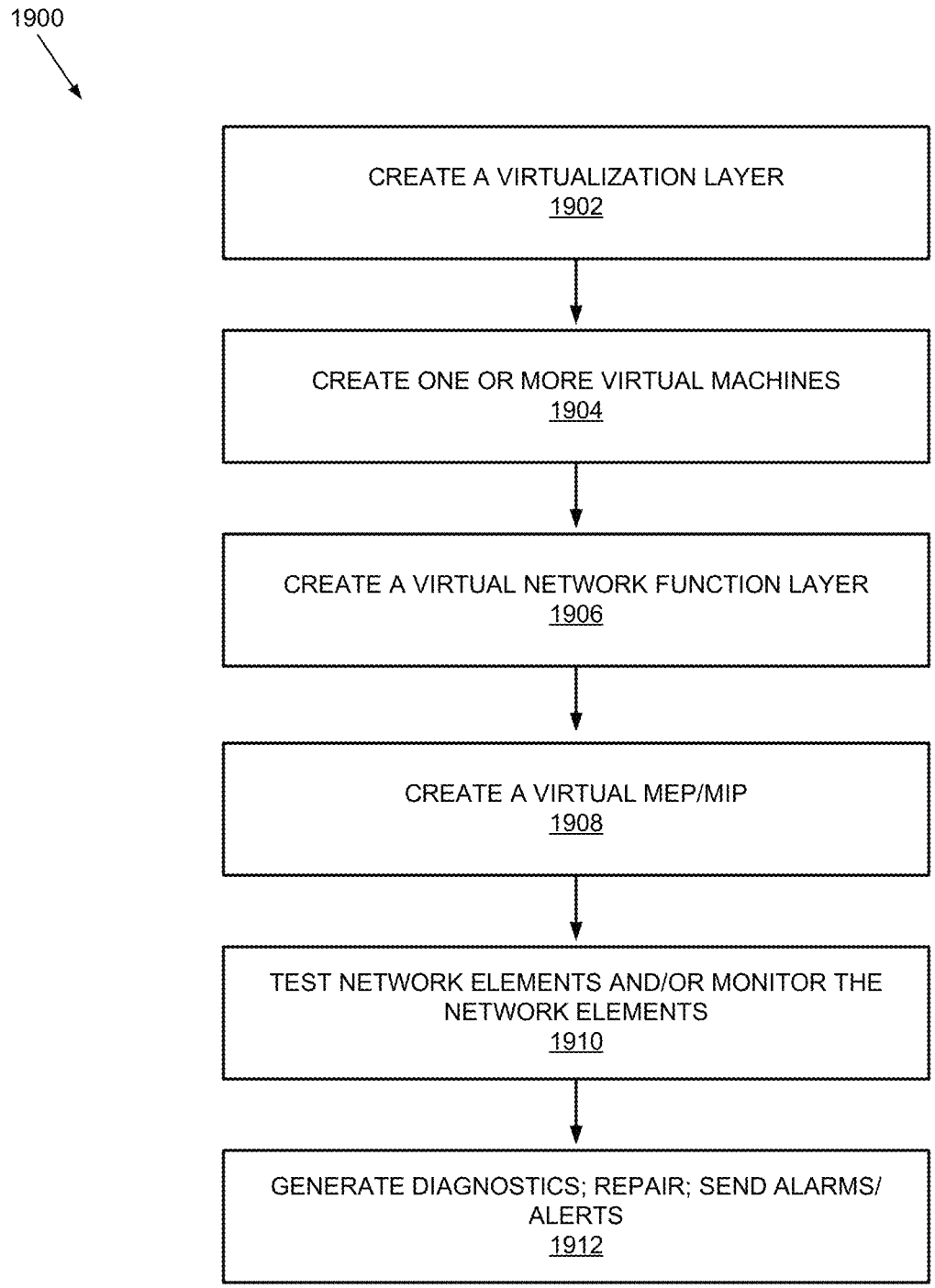
FIG. 19 illustrates an exemplary process that is associated with Continuity Fault Management (CFM).

FIG. 19 illustrates an exemplary process 1900 that is associated with Continuity Fault Management (CFM). In some implementations, process 1900 may be performed by one or more virtualized systems (e.g., components in virtual layers and/or infrastructure layer in FIG. 2) in the cloud services architecture 100.

Process 1900 may include creating a virtualization layer on top of a physical layer of a device or a set of devices (block 1902). For example, a virtual system may have a hypervisor, or yet another type of hardware abstraction layer.

Process 1900 may further include creating one or more virtual machines on top of virtualization layer (block 1904). In creating the virtual machines or a virtual machine layer, the virtualization layer may provide the resources that are necessary for the VM creation (e.g., MAC addresses, IP addresses, network port, etc.). Once the virtual machines are in place, virtual network functions (VNF) may be created based on the virtual machines and/or elements in the virtualization layer (block 1906). Depending on the implementation and/or the use case, a connection layer may also be created based on or on top of the VNF layer. At this point, virtual maintenance endpoints (vMEPs) and/or virtual maintenance intermediate points (vMIPs) may be created at appropriate network nodes (block 1908). For example, virtual MEP function or MIP function may be created at a node serving as a cSCTP for connection layer. In creating the virtual MEP or MIP, the virtualized system may need to be configured, so that they have appropriate MEG levels. Depending on the use case, the virtualized system may create the vMEP/vMIP at any virtual layer.

The vMEP and vMIPs may test and/or monitor virtualization layer (block 1910). As described above, vMEP may send CFM messages (e.g., loopback message PDU) to a peer MEP and/or receive replies therefrom at VM-L or VNF-L, etc.

Based on data collected from the CFM messages, a vMEP may generate fault statistics; generate alarms and/or alerts; and/or initiate repair processes.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 19, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, shared, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:
   a communication interface;
   a memory device to store a set of processor-executable instructions; and
   one or more processors configured to execute the processor-executable instructions, wherein executing the processor-executable instructions causes the one or more processors to:
   create a virtualization layer on top of a physical layer of the system;
   create a virtual machine layer on top of the virtualization layer;
   create a virtual network function (VNF) layer based on the virtual machine layer and the virtualization layer;
   create a connection layer based on the VNF layer;
   create a first virtual maintenance endpoint (MEP) in a first layer comprising at least one of the virtualization layer, the virtual machine layer, the VNF layer, or the connection layer; and
   create a second virtual MEP in a second layer comprising at least one of the virtualization layer, the virtual machine layer, the VNF layer, or the connection layer, wherein the second layer is different from the first layer,
   wherein the first virtual MEP includes a first virtual media access control (MAC) address and the second virtual MEP includes a second virtual MAC address,
   wherein the first virtual MEP and the second virtual MEP enable any continuity fault message (CFM) to traverse the virtualization layer, the virtual machine layer, the VNF layer, and the connection layer, and
   wherein the first virtual MEP is configured to:
   send a first CFM message to a physical MEP having a physical MAC address or the second virtual MEP; and
   receive a second CFM message from the physical MEP or the second virtual MEP.

2. The system of claim 1, wherein the first CFM message includes one of:
   a loopback message (LBM) protocol data unit;
   a delay measurement message (DMM) protocol data unit;
   a loss measurement message (LMM) protocol data unit;
   a continuity check message (CCM) protocol data unit; or
   a link trace message (LTM) protocol data unit.

3. The system of claim 2, wherein the second CFM message from the second virtual MEP includes one of:
   a loss measurement reply (LMR) protocol data unit (PDU); or
   a delay measurement reply (DMR) PDU.

4. The system of claim 1, wherein the first CFM message includes the first virtual MAC address, and
   wherein an Ethernet frame that includes the first CFM message has the first virtual MAC address as a destination address in a header portion of the Ethernet frame.

5. The system of claim 1, wherein the first virtual MEP is located at one of:
   a cloud service connection termination point;
   a cloud service provider connection termination point; or
   a cloud carrier-provider connection termination point.

6. The system of claim 1, wherein after the first virtual MEP sends the first CFM message, the first CFM message passes through the virtual machine layer, the virtualization layer, and a physical layer.

7. The system of claim 6, wherein when the first CFM message passes through the virtual machine layer, the first CFM message passes through a virtual maintenance intermediate point (vMIP).

8. The system of claim 1, wherein the first virtual MEP has a level that is associated with virtual maintenance entity group (MEG).

9. The system of claim 8, wherein the first virtual MEP is associated with one of:
   a cloud service user maintenance association (MA);
   a test MA;
   a cloud service connection MA;
   a cloud service operator MA;
   a cloud user interface MA;
   a cloud service interface MA; or
   a cloud service provider-cloud service provider interface MA.

10. A method comprising:
creating, by a system, a virtualization layer on top of a physical layer of the system;
creating, by the system, a virtual machine layer on top of the virtualization layer;
creating, by the system, a virtual network function (VNF) layer based on the virtual machine layer and the virtualization layer;
creating, by the system, a connection layer based on the VNF layer;
creating a first virtual maintenance endpoint (MEP) in a first layer comprising one at least of the virtualization layer, the virtual machine layer, the VNF layer, or the connection layer, and
creating a second virtual MEP in a second layer comprising at least one of the virtualization layer, the virtual machine layer, the VNF layer, or the connection layer, wherein the second layer is different from the first layer,
wherein the first virtual MEP includes a first virtual media access control (MAC) address and the second virtual MEP includes a second virtual MAC address,
wherein the first virtual MEP and the second virtual MEP enable any continuity fault message (CFM) to traverse the virtualization layer, the virtual machine layer, the VNF layer, and the connection layer, and
wherein the first virtual MEP is configured to:
send a first CFM message to a physical MEP having a physical MAC address or the second virtual MEP having the second virtual MAC address; and
receive a second CFM message from the physical MEP or the second virtual MEP.

11. The method of claim 10, wherein the first CFM message includes one of:
a loopback message (LBM) protocol data unit;
a delay measurement message (DMM) protocol data unit;
a loss measurement message (LMM) protocol data unit;
a continuity check message (CCM) protocol data unit; or
a link trace message (LTM) protocol data unit.

12. The method of claim 11, wherein the second CFM message from the second virtual MEP includes one of:
a loss measurement reply (LMR) PDU; or
a delay measurement reply (DMR) PDU.

13. The method of claim 10, wherein the first CFM message includes the first virtual MAC address, and
wherein an Ethernet frame that includes the first CFM message has the first virtual MAC address as a destination address in a header portion of the Ethernet frame.

14. The method of claim 10, wherein the first virtual MEP is located at one of:
a cloud service connection termination point;
a cloud service provider connection termination point; or
a cloud carrier-provider connection termination point.

15. The method of claim 10, wherein after the first virtual MEP sends the first CFM message, the first CFM message passes through the virtual machine layer, the virtualization layer, and a physical layer.

16. The method of claim 15, wherein when the first CFM message passes through the virtual machine layer, the first CFM message passes through a virtual maintenance intermediate point (vMIP).

17. The method of claim 10, wherein the first MEP has a level that is associated with virtual maintenance entity group (MEG).

18. A non-transient computer-readable medium, comprising computer-executable instructions, when executed by one or more processors, cause the one or more processors to:
create a virtualization layer on top of a physical layer of a system hosting the one or more processors;
create a virtual machine layer on top of the virtualization layer;
create a virtual network function (VNF) layer based on the virtual machine layer and the virtualization layer;
create a connection layer based on the VNF layer;
create a first virtual maintenance endpoint (MEP) in a first layer comprising at least one of the virtualization layer, the virtual machine layer, the VNF layer, or the connection layer, and
create a second virtual MEP in a second layer comprising at least one of the virtualization layer, the virtual machine layer, the VNF layer, or the connection layer, wherein the second layer is different from the first layer,
wherein the first virtual MEP includes a first virtual media access control (MAC) address and the second virtual MEP includes a second virtual MAC address,
wherein the first virtual MEP and the second virtual MEP enable any continuity fault message (CFM) to traverse the virtualization layer, the virtual machine layer, the VNF layer, and the connection layer, and
wherein the first virtual MEP is configured to:
send a first CFM message to a physical MEP having a physical MAC address or the second virtual MEP; and
receive a second CFM message from the physical MEP or the second virtual MEP.

19. The non-transient computer-readable medium of claim 18, wherein the first CFM message includes one of:
a loopback message (LBM) protocol data unit;
a delay measurement message (DMM) protocol data unit;
a loss measurement message (LMM) protocol data unit;
a continuity check message (CCM) protocol data unit; or
a link trace message (LTM) protocol data unit.

20. The non-transient computer-readable medium of claim 19, wherein the second CFM message from the maintenance point includes one of:
a loss measurement reply (LMR) PDU; or
a delay measurement reply (DMR) PDU.

* * * * *